United States Patent

[11] 3,599,832

[72] Inventor Carlowen Smith
 Pittsburgh, Pa.
[21] Appl. No. 887,572
[22] Filed Dec. 23, 1969
[45] Patented Aug. 17, 1971
[73] Assignee Industrial Pneumatic Systems, Inc.
 Fairmont, W. Va.

[54] FLOW CONTROL OF FLUIDIZED MATERIAL
 9 Claims, 5 Drawing Figs.
[52] U.S. Cl. .................................................. 222/1,
 222/57, 302/35
[51] Int. Cl. ...................................................... B67b 7/00
[50] Field of Search .......................................... 302/17, 24,
 35, 42, 36; 222/193, 195, 55, 57

[56] References Cited
 UNITED STATES PATENTS
 3,163,329 12/1964 Mornas ........................ 222/193 X
 3,372,958 3/1968 Black ........................... 222/193 X

*Primary Examiner*—Stanley H. Tollberg
*Attorney*—Revere B. Gurley

ABSTRACT: This apparatus controls the flow of fluidized granular material by utilizing the pressure in the conduit to actuate one valve to increase the supply of gas to the conduit and another valve to restrict the flow of material in the conduit. Any increase in the amount of material will increase the pressure and add more gas and reduce the flow of material into the conduit to maintain continuous flow of fluidized material.

When used in a rockdusting system, the fluidized material is discharged from a nozzle at the end of the conduit under control of a manually actuated valve. Closing the valve causes pressure in the conduit closure of the valve restricting flow of the material. The air supply to the conduit will be increased and the supply of material reduced with decrease in the discharge of material at the nozzle.

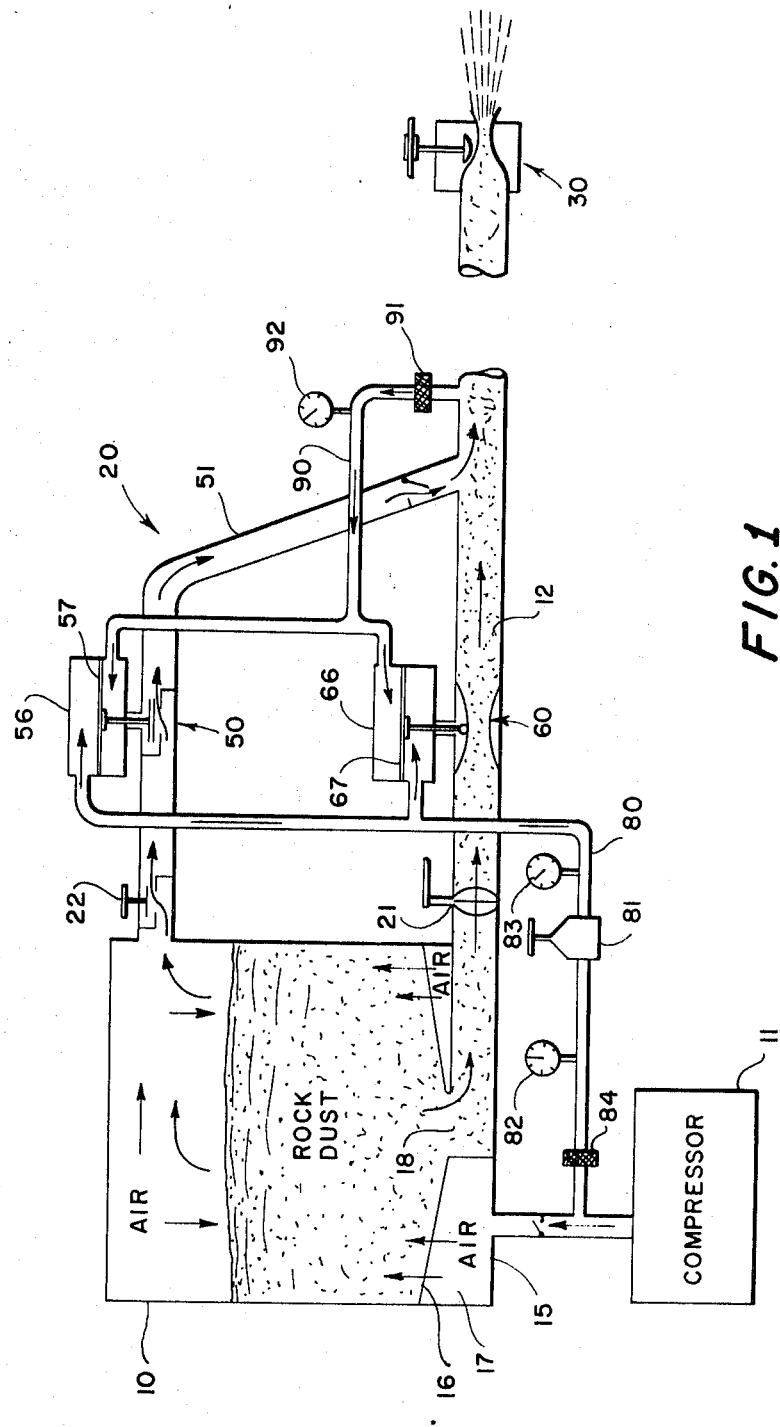

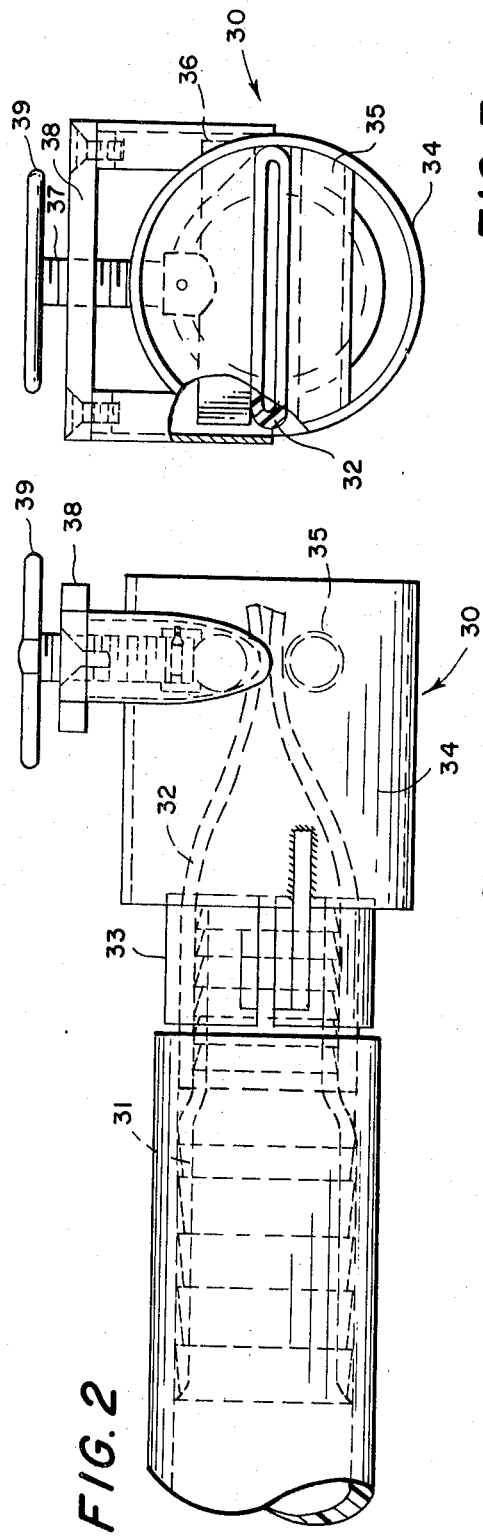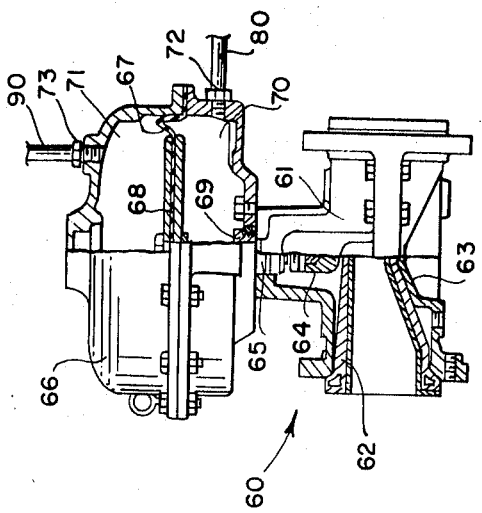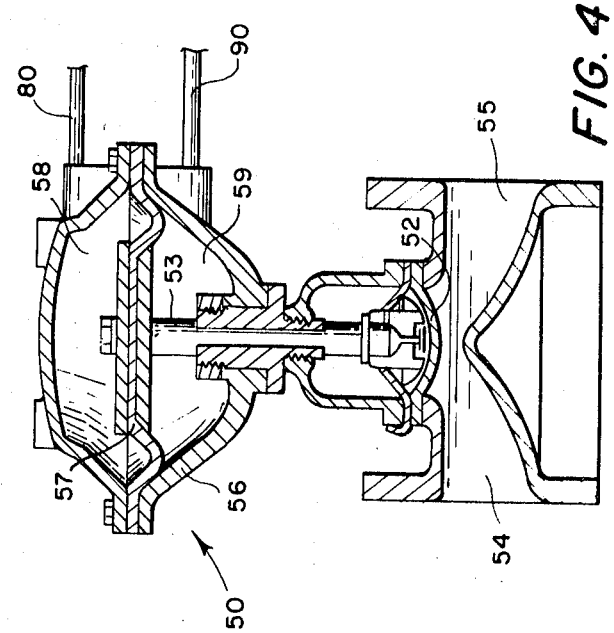

3,599,832

FLOW CONTROL OF FLUIDIZED MATERIAL

NATURE AND OBJECTS OF INVENTION

This invention relates to control of flow of fluidized material, i.e., granular or pulverulent material entrained in a gas and conveyed under pressure in a conduit such as a pipe or hose. The apparatus to control the flow of fluidized material may constitute a part of a system for rockdusting for use in mines.

The primary object of the invention is to control the flow of fluidized material to maintain the proper ratio of solid material and gas under varying conditions of restricted flow, and to start and cutoff discharge of the material with automatic cessation and resumption of flow of material through the conduit. In the application to a system of rockdusting, the discharge of material at the nozzle may be restricted or stopped, and flow of material and gas in proper proportions will be automatically restricted or resumed in response to the operation at the nozzle.

The flow of fluidized material is controlled by pressure developed in the conduit. An increase in pressure restricts the flow of material in the conduit and at the same time, increases the supply of gas to maintain the proper ratio of gas to solid material with elimination of clogging and blocking of the conduit. The pressure in the material flow conduit acts on two valves, one in the material flow control conduit and one in a gas supply conduit connected to the material flow conduit, causing the first valve to decrease flow of the fluidized material and the second to increase the supply of gas. An increase in density of material, by increasing the pressure, thereby causes more gas and less material to be injected into the material flow conduit and flow of the material continues freely and smoothly.

This operation is especially adaptable to a rockdusting system. A tank of fluidized rockdust material may be connected to the nozzle by a long hose, so that the rockdusting operation may be carried on at a distance from the tank. A valve in the nozzle is operated manually to start or stop the dusting operation. The flow control apparatus controls the flow of material and gas in response to operation of the valve, starting or stopping the flow of material as the valve is operated at the nozzle, and adjusting the flow with change in the rate of discharge of the rockdust material.

DRAWINGS

In the drawings:

FIG. 1 is a diagrammatic view of a rockdusting system which incorporates the material flow control apparatus.

FIG. 2 is a side elevation of the nozzle and discharge valve.

FIG. 3 is an end elevation of the nozzle of FIG. 2.

FIG. 4 is a vertical cross section of a gas flow control valve used in the flow control apparatus.

FIG. 5 is an elevational view, with parts in vertical cross section, of a material flow control valve used in the flow control apparatus.

GENERAL DESCRIPTION

The low control apparatus of this invention is used in conveying fluidized material and has special advantages when incorporated in a rockdusting system, as illustrated diagrammatically in Figure 1. The rockdust material is fluidized in the closed container or tank 10, conveyed by conduit 12 from the container 10 under control of the flow control apparatus 20 to a nozzle 30, and discharged upon actuation of a manually actuated valve in the nozzle. Flow of the fluidized material is regulated automatically by the flow control apparatus 20, in which a pressure actuated gas flow control valve 50 controls the supply of gas to the fluidized material in the material flow conduit 12, and a pressure actuated material flow control valve 60 controls the flow of material in the material flow conduit.

The rockdust container 10 may be of the type shown in applicant's U.S. Pat. No. 3,356,264 and 3,393,832, but is shown here in diagrammatic form with a pervious bottom wall 16 spaced above the bottom 15 of the closed container to form an airspace 17. Gas supplied by a compressor 11 to the space 17 passes upwardly through the rockdust material which is fluidized and discharged through the outlet 18 and conveyed by material flow conduit 12 to nozzle 30. Conduit 12 may be closed by manual valve 21.

The end of conduit 12 is formed as a hose connected to a fitting 31 on the nozzle 30. To the other end of fitting 31, a flexible tubular member 32 is secured by a collar 33 integral with the circular nozzle body 34, which receives the outer end of the flexible tubular member 32. A transverse member 35 is fixed across the mouth of the nozzle 34 below said flexible member and a complementary movable transverse member 36 is slidably mounted above the flexible member, so that when the member 36 is moved toward the lower member 35, the tubular member 32 is flattened to restrict the discharge opening, while forming an elongated outlet for emission of rockdust material. The member 36 is moved radially by a threaded shaft 37 journaled to the movable member 36 and threaded into a plate 38 carried by the nozzle body 34. A handwheel 39 on the end of shaft 37 rotates the shaft and moves the member 36 to adjust the opening in the tubular member 32.

The pressure actuated material flow control valve 60 to control flow of fluidized material through the conduit 12 is a standard valve of the 6300 series manufactured by the Flexible Valve Corporation. The valve casing 61 contains flexible tubular valve body 62 and is formed with a transverse bridge 63 supporting the center of the tubular body 62. A transverse bar 64 fixed on the end of an operating stem 65 is movable toward bridge 63 to close the flexible tubular body 62. A fluid motor in a pressure casing 66 fixed to valve casing 61 comprises a diaphragm 67 separating the pressure casing into two chambers 70 and 71. Operating stem 65 extends through bushing 69 into pressure casing 66 with its end fixed to plates 68 of diaphragm 67. Gas may be supplied under pressure to chambers 70 and 71 through connections 72 and 73 to operate the diaphragm to close and open valve 60.

Downstream from the material flow control valve 60 in the material flow conduit 12, a gas supply conduit 51 connects to the material flow conduit 12 to inject gas into the fluidized material. This gas conduit 51 connects to the top of the material container 10 above the level of the material to receive gas under pressure from the container. The gas conduit may be closed by manually operated valve 22, and the passage of gas is controlled by the pressure actuated gas flow control valve 50. The valve 50 is a standard Grinnell valve, having a diaphragm 52 carried by stem 53 to close the passage between ports 54 55. The casing 56 contains the fluid motor comprising a diaphragm 57 which is fixed to the valve stem 53 and which divides casing 56 into two chambers 58, 59 so that pressure on the diaphragm 57 may open and close valve 50. Gas conduit 51 may be closed by manual valve 22.

The material flow control valve 60 and gas flow control valve 50 are actuated by gas pressure to open and restrict the material flow conduit 12 and the gas conduit 51. A pipe 80 from the gas compressor 11 has a pressure regulator valve 81 which provides constant pressure in the line. The valve 81 is a standard adjustable pressure regulator valve, one example of which is known as Wilkerson regulator Model 2001 series B. Gauges 82 and 83 in the line 80 above and below the regulator register the pressure in the line and provide for adjustment of the pressure by valve 81. A filter 84 in the line prevents dust or extraneous matter reaching the regulator valve 81 or the fluid motors of valves 50 and 60.

The line 80 provides a source of constant pressure to the fluid motors of the control valves. This line leads to the chamber 70 of the fluid motor of valve 60 and acts on the diaphragm 67 to open the valve. The line 80 also leads to chamber 58 of the fluid motor of gas flow control valve 50 and acts on the diaphragm 57 to close the gas control valve 50.

The operation of valves 50 and 60 is further controlled by pressure in the material flow conduit 12 below the valve 60 through a pipe 90 connected to the conduit 12 at a point downstream from valve 60. This pipe connects to chamber 71 of the fluid motor of valve 60 to act to close the valve in opposition to the constant pressure in pipe 80. The pipe 90 also connects to chamber 59 of the fluid motor of valve 50 so that the pressure acts on diaphragm to open the valve against the constant pressure. An increase in pressure in the material flow conduit 12 will increase the restriction of valve 60 and decrease the flow of fluidized material, and will decrease the restriction of the gas flow control valve 50 and increase the gas supply to the conduit 12. A filter 91 in the pipe 90 prevents passage of dust from the conduit 12 to the fluid motors. A gauge 92 registers the pressure in the pipe 90.

In operation of the rockdusting system, valves 21 and 22 in the material flow conduit 12 and gas conduit 51 are first closed, and compressor 11 is operated to compress gas, usually air, in the container 10. The pressure regulator valve 81 is set at the pressure desired in the line and, when valves 21 and 22 are opened, the system is ready for operation.

The valve in nozzle 30 is open to discharge the material at the rate required for the dusting operation, the reduced pressure causing valve 60 to open and valve 50 to close partially, as determined by the pressure in the conduit 12 resulting from the valve in nozzle 30. The fluid motors of these valves will hold the valves in a state of equilibrium between the constant pressure of line 80 and pressure in conduit 12. The rockdusting operation may be stopped by closing the valve in the nozzle, and commenced at any time merely by opening the valve, so that one man at the nozzle has complete control of the entire apparatus.

This control of the flow assures sufficient gas in the fluidized material to prevent clogging and maintaining a proper ratio of gas to material. The efficiency of the rockdusting operation is improved and the danger caused by "bucking" of the hose from improper mixture of material and gas is avoided.

When the pressure regulator 81 is set for a given fluid pressure, any increase in pressure in the material flow conduit 12 in excess of that for which the regulator is proportioned, will open the gas flow control valve material and farther to supply more gas to the fluidized material in conduit 12, and material valve 60 will close partially until the pressure in conduit 12 is approximately that of the proportioned ratio of pressure in fluid supply pipe 80. At the same time, the material flow control valve 60 may also increase its restriction to flow in conduit 12, an action which will decrease the pressure in the conduit. The flow control apparatus will maintain a pressure in the material flow conduit 12 as determined by the setting of pressure regulator, by control of the supply of gas or the combined action of both controls. When a uniform mixture of material and gas is required under different operating conditions, this combined action is especially effective.

While especially exemplified in the rockdusting system, the flow control apparatus may be used to regulate the flow in any fluidized conveying system. With this control, flow of the material may be started and stopped at a distance, blockage of the material is avoided and uniform flow can be maintained.

What I claim is:

1. In a fluidized material conveying system, a material flow conduit for conveying said fluidized material, an adjustable discharge valve for said conduit to control discharge of material from said conduit, and means to supply gas to said fluidized material to prevent clogging when said discharge valve restricts passage of said material, comprising a gas conduit for supplying gas to said fluidized material connected to said material flow conduit, a pressure actuated gas flow control valve in said gas conduit, and means to adjust said pressure actuated valve to increase the flow of gas in said gas conduit in response to increase of pressure in said material flow conduit, which results from an increase in material in said material flow conduit or from closure of said discharge valve.

2. In a fluidized material conveying system, a material flow conduit for conveying said fluidized material, adjustable material flow control means to control flow of fluidized material in said material flow conduit, a gas supply conduit connected to said material flow conduit downstream from said material flow control means to supply gas to said fluidized material, adjustable flow control means to restrict flow of gas in said gas supply conduit, and means to adjust said two flow control means in response to variations in pressure in said material flow conduit downstream from said material flow control means.

3. In a fluidized material conveying system, a material flow conduit for conveying said fluidized material, a discharge valve for said conduit to control discharge of material from said conduit, a pressure actuated adjustable material flow control valve in said conduit upstream from said discharge valve, means to supply gas to said fluidized material to prevent clogging when said discharge valve restricts passage of said material, comprising a gas conduit for supplying gas to said fluidized material connected to said material flow conduit between said valves, and a pressure actuated gas flow control valve in said gas conduit, and means to adjust said pressure actuated valves to control the flow of material in said material flow conduit and the flow of gas in in said gas conduit under control of the pressure in said material flow conduit between said two valves in said material flow conduit so that said material does not clog said conduit and that sufficient gas to material ratio is supplied to maintain flow of material.

4. In a fluidized material conveying system, a material flow conduit for conveying said fluidized material, adjustable material flow control means to restrict flow of fluidized material in said material flow conduit, a gas supply conduit connected to said material flow conduit downstream from said material flow control means to supply gas to said fluidized material, adjustable gas flow control means to control flow of gas in said gas supply conduit, and means operated by pressure in said material flow conduit downstream from said material flow control means to actuate said adjustable gas flow control means to control the flow of gas to said material flow control conduit, so that increase of pressure in said conduit increases the ratio of gas to material in said material flow conduit.

5. In a rockdusting system, a reservoir including means to admit gas to fluidize rockdust material in said reservoir, a source of gas under pressure connected to said reservoir to fluidize the material therein, a material flow conduit leading from said reservoir to convey fluidized material, an adjustable valve on the end of said conduit to control the discharge of material from said conduit, a gas conduit for gas from said source and connected to said material flow conduit for supplying gas to said fluidized material in said material flow conduit, a pressure actuated material flow control valve in said material flow conduit between said reservoir and the connection of said gas conduit for controlling flow of fluidized material, a pressure actuated gas flow control valve in said gas conduit for controlling the gas supply to said material flow conduit, means connecting a source of gas under pressure and said material flow conduit beyond said gas conduit to said pressure actuated valves, so that an increase in pressure in said material flow conduit causes the material pressure actuated control valve to restrict flow of material and decrease the pressure in the material flow conduit beyond said first valve and also causes the second valve to open so that more gas is admitted to the material flow conduit to reduce the pressure in said material flow conduit.

6. The method of controlling the flow of fluidized material under fluid pressure through a material flow conduit comprising supplying fluid to said fluidized material at a point in said conduit, applying the difference in pressure between a constant fluid pressure source and the pressure in said conduit downstream from said point to control the fluid supplied to said conduit so that the ratio of fluid to material is increased with increase in pressure in said conduit.

7. The method of conveying fluidized material through a material flow conduit under pressure, comprising applying gas under pressure to material to be conveyed to fluidize said material and to convey said material in said conduit, applying the difference in pressure between a constant pressure source and the pressure in said conduit to restrict passage of said fluidized material in said conduit, supplying gas to said conduit downstream from the restriction in said passage and applying said difference in pressure to control the gas supplied to said conduit so that the ratio of gas to material is increased with increase in pressure in said conduit.

8. The method of conveying fluidized material through a material flow conduit under pressure, comprising variably restricting the flow of material at a point in said conduit, supplying gas to said conduit downstream from said point, variably restricting the flow of gas to said conduit, and increasing the restriction of flow of said material and decreasing the restriction of the flow of gas in response to increase in pressure in said conduit downstream from said point.

9. The method of rockdusting which comprises passing gas into a mass of rockdusting material to fluidize said material under pressure, conveying said fluidized material through a conduit to a nozzle for discharging said material for rockdusting, restricting the discharge of said material through said nozzle according to requirements of the operation, restricting passage of said fluidized material through said conduit in response to the difference in pressure between a constant pressure source and the pressure in said conduit between said nozzle and the restriction of the passage in said conduit, and supplying gas to said conduit between said nozzle and said restriction of the passage in response to said difference in pressure, so that increase in pressure in said conduit increases the ratio of gas to material in said conduit.

UNITED STATES PATENT OFFICE
CERTIFICATE OF CORRECTION

Patent No. 3,599,832          Dated August 17, 1971

Inventor(s) Carlowen Smith

It is certified that error appears in the above-identified patent and that said Letters Patent are hereby corrected as shown below:

Column 2, line 52, after "54" insert a comma. Column 3, line 42, after "valve" cancel "material and" and insert -- 50 --; line 69, before "fluidized" cancel "to said".

Signed and sealed this 24th day of October 1972.

(SEAL)
Attest:

EDWARD M. FLETCHER, JR.          ROBERT GOTTSCHALK
Attesting Officer          Commissioner of Patents